United States Patent [19]

Bourgeois et al.

[11] Patent Number: 4,671,949

[45] Date of Patent: Jun. 9, 1987

[54] NOVEL ANHYDROUS SODIUM TRIPOLYPHOSPHATE

[75] Inventors: Jean-Paul Bourgeois, Creteil; Frederic Couffin, Montgeron; Claude Magnier, Paris, all of France

[73] Assignee: Rhone-Poulenc Industries, Paris, France

[21] Appl. No.: 813,786

[22] Filed: Dec. 27, 1985

Related U.S. Application Data

[63] Continuation of Ser. No. 721,437, Apr. 9, 1985, abandoned, which is a continuation of Ser. No. 637,815, Aug. 6, 1984, abandoned, which is a continuation of Ser. No. 395,114, Jul. 6, 1982, abandoned.

[30] Foreign Application Priority Data

Jul. 6, 1981 [FR] France ............................. 81 13221

[51] Int. Cl.$^4$ ..................... C01B 15/16; C01B 25/26
[52] U.S. Cl. ................................. 423/315; 423/305; 159/48.1
[58] Field of Search ............... 423/305, 307, 308, 312, 423/313, 314, 315; 159/48.1; 23/313 R, 293 A

[56] References Cited

U.S. PATENT DOCUMENTS

| | | |
|---|---|---|
| 3,387,924 | 6/1968 | Heymer . |
| 3,562,768 | 2/1971 | Edquist et al. ...................... 423/315 |
| 4,265,702 | 5/1981 | Prodhon et al. ................... 159/48.1 |

FOREIGN PATENT DOCUMENTS

739828  10/1968  Belgium ............................. 423/315

*Primary Examiner*—Gregory A. Heller
*Attorney, Agent, or Firm*—Burns, Doane, Swecker & Mathis

[57] ABSTRACT

A novel anhydrous sodium tripolyphosphate, well adapted as an additive for foodstuffs and detergent compositions, has an Na/P ratio of essentially 1.667±0.01, an apparent density of from 0.5 to 1.1, a mean agglomerate size of less than 100 microns, a phase I content ranging from 15 to 6% by weight, is devoid of insoluble fraction, and displays zero solidification or caking in a quiescent solvent medium.

7 Claims, 1 Drawing Figure

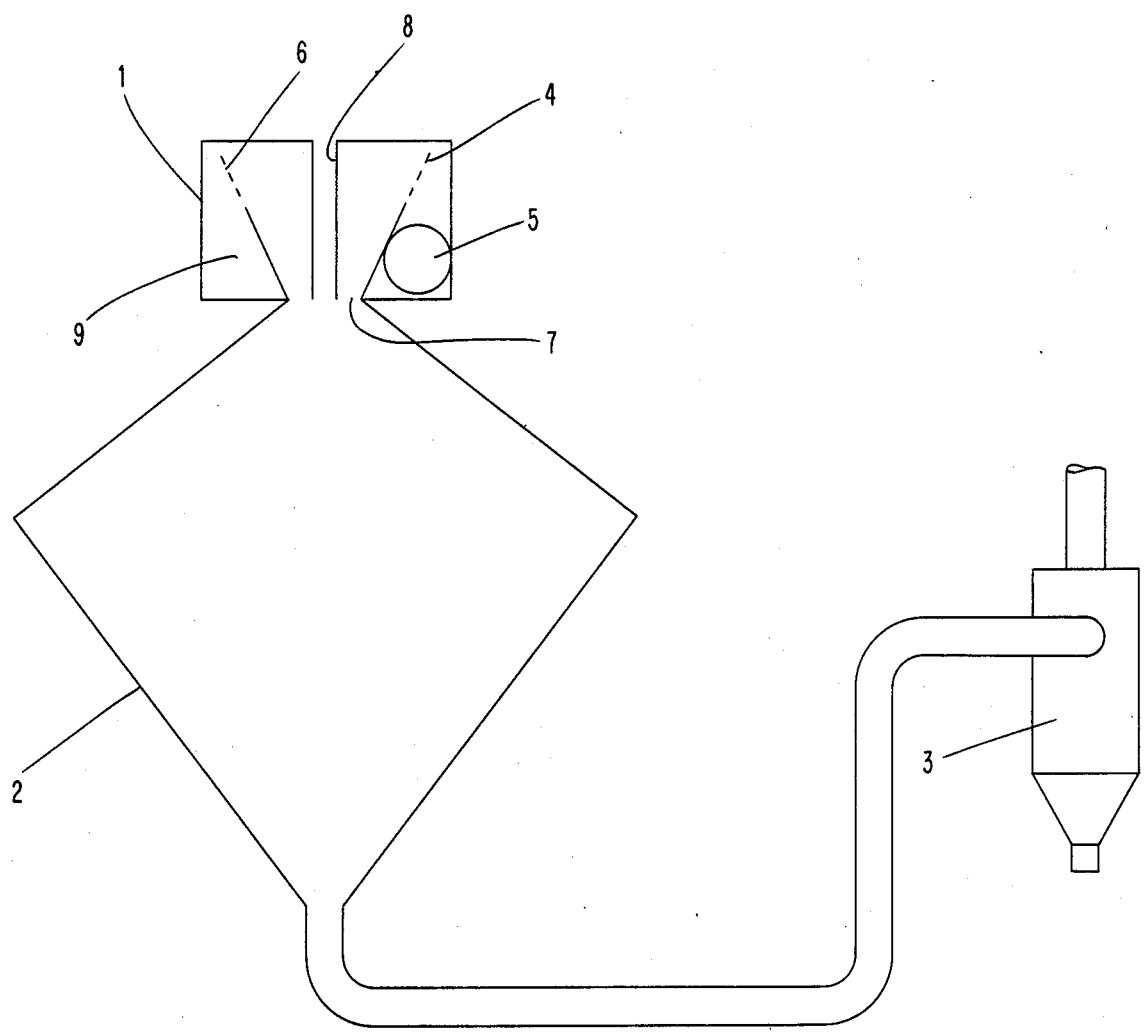

NOVEL ANHYDROUS SODIUM TRIPOLYPHOSPHATE

CROSS-REFERENCE TO RELATED APPLICATIONS

This application is a continuation of application Ser. No. 721,437, filed Apr. 9, 1985. which is a continuation of Ser. No. 637,815, filed Aug. 6, 1984, which is a continuation of Ser. No. 395,114, filed July 6, 1982, all now abandoned.

CROSS-REFERENCE TO RELATED FILING

Our Disclosure Document No. 103,387, filed Oct. 8, 1981.

BACKGROUND OF THE INVENTION

1. Field of the Invention:

The present invention relates to a novel sodium tripolyphosphate, a process for the preparation thereof, and to the use of same in various comestibles and foodstuffs, and in detergent compositions.

2. Description of the Prior Art:

Sodium tripolyphosphate is known to this art and is said to have the general formula $Na_5P_3O_{10}$, but the apparent simplicity of the formula in reality disguises truly complex inorganic chemistry.

In theory, the tripolyphosphate is obtained from a solution of mono- and disodium orthophosphates by adjusting the Na/P ratio thereof to the approximate value of 1.667, in a process which can be represented as follows:

$$\underbrace{NaH_2PO_4 + 2Na_2HPO_4}_{\text{solution}} \xrightarrow{\text{heat treatment}} Na_5P_3O_{10} + 2H_2O$$

In reality, however, there exist an extensive number of possible reactions having several equilibria, which are summarized below (nonetheless, it is not claimed that each such reaction indeed occurs, to any extent whatsoever, or that the following list is exhaustive):

$$NaH_2PO_4 + 2Na_2HPO_4 \longrightarrow Na_5P_3O_{10} + 2H_2O \quad (a)$$

$$2NaH_2PO_4 \longrightarrow Na_2H_2P_2O_7 + H_2O \quad (b)$$

$$4Na_2HPO_4 \longrightarrow 2Na_4P_2O_7 + 2H_2O$$

$$Na_2H_2P_2O_7 + 2Na_4P_2O_7 \longrightarrow 2Na_5P_3O_{10} + H_2O$$

$$2(NaH_2PO_4, Na_2HPO_4) \longrightarrow Na_2H_2P_2O_7 + Na_4P_2O_7 + 2H_2O \quad (c_1)$$

$$2Na_2HPO_4 \longrightarrow Na_4P_2O_7 + H_2O$$

$$Na_2H_2P_2O_7 + 2Na_4P_2O_7 \longrightarrow 2Na_5P_3O_{10} + H_2O$$

$$2Na_3H_3(PO_4)_2 \longrightarrow 2Na_3HP_2O_7 + 2H_2O \quad (c_2)$$

$$2Na_2HPO_4 \longrightarrow Na_4P_2O_7 + H_2O$$

$$2Na_3HP_2O_7 + Na_4P_2O_7 \longrightarrow 2Na_5P_3O_{10} + H_2O$$

$$2NaH_2PO_4 \longrightarrow Na_2H_2P_2O_7 + H_2O \quad (d)$$

$$Na_2H_2P_2O_7 \longrightarrow \ldots \longrightarrow \frac{2}{n}(NaPO_3)_n + H_2O$$

$$4Na_2HPO_4 \longrightarrow 2Na_4P_2O_7 + 2H_2O$$

$$2Na_4P_2O_7 + \frac{2}{n}(NaPO_3)_n \longrightarrow 2Na_5P_3O_{10}$$

$$2NaH_2PO_4 \longrightarrow Na_2H_2P_2O_7 + H_2O \quad (e)$$

$$4Na_2HPO_4 + Na_2H_2P_2O_7 \longrightarrow 2Na_5P_3O_{10} + 3H_2O$$

$$2Na_3H_3(PO_4)_2 \longrightarrow 2Na_3HP_2O_7 + 2H_2O \quad (f)$$

$$2Na_3HP_2O_7 \longrightarrow Na_6P_4O_{13} + H_2O$$

$$2Na_2HPO_4 \longrightarrow Na_4P_2O_7 + H_2O$$

$$Na_6P_4O_{13} + Na_4P_2O_7 \longrightarrow 2Na_5P_3O_{10}$$

More simply, it will be appreciated that short chain (soluble or long chain (insoluble) sodium polyphosphates and sodium pyrophosphates can be obtained in addition to the desired tripolyphosphate.

The starting solution is readily prepared by neutralizing $H_3PO_4$ with NaOH or by mixing $NaH_2PO_4 + 2Na_2HPO_4$ orthophosphates. A heat treatment is then conducted upon the solution thus prepared by known processes, such as those involving spraying, rotary dryers, fluidized bed or open flame, in a single stage (or in two stages, if the intermediate orthophosphate is separated). Depending upon the particular thermocondensation conditions (temperature, partial pressure of water, Na/P ratio, impurities) the TPP obtained will be 100% phase I, 100% phase II or a mixture of phases I and II.

It too is known that in certain applications, particularly in the field of foodstuffs and other comestibles, and in detergent compositions, that if the TPP is dissolved in a medium which is either not agitated (quiescent) or inadequately (slightly) agitated, this typically produces lumps which are difficult to dissolve or result in caking or hardening. Thus, anhydrous phases I and II result in partial caking or hardening.

Hydrated phase II results in virtually instantaneous total caking or hardening, whereas hydrated phase I does not result in any caking or hardening. A TPP which will readily dissolve is thus one which contains less than 40% of phase I and which has been "prehydrated" (as in the test described below).

Prehydration can be effected by spraying water onto the TPP upon the synthesis thereof, or by the natural fixing of atmospheric-borne water. The amount of prehydration required to enable the TPP to be dissolved without solidifying in a non-agitated or quiescent medium is at least 0.6%, measured by weight loss at 150° C.

SUMMARY OF THE INVENTION

Accordingly, a major object of the present invention is the provision of a novel sodium tripolyphosphate, having an Na/P ratio of 1.667±0.01, the weight loss of the water of which at 150° C. being less than 0.6%, and preferably less than 0.02%, and which is characterized in that it displays zero solidification or caking in a non-agitated or quiescent medium, in the following test:

Test:

7 g of TPP are rapidly added (2 sec) to 20 ml of distilled water. The appearance and hardness of any deposit of undissolved TPP are noted 2, 5, 10 and 20 minutes after the addition.

The caking, hardening or solidification may be zero, partial or total and may begin either more or less rapidly.

This result is all the more surprising, considering that total solubilization occurs whatever the proportion of phase I and the granulometry of the product, and despite the fact that the loss by weight of water at 150° C. is less than 0.6%.

BRIEF DESCRIPTION OF THE DRAWING

The FIGURE of Drawing is a schematic/diagrammatic illustration or a phase contactor/separator suitable for carrying out the process according to the invention.

DETAILED DESCRIPTION OF THE INVENTION

More particularly according to this invention, chemically the Na/P ratio of the product sodium TPP is 1.667±0.01, and same may comprise varying amounts of the phases I and II.

In a preferred embodiment of the invention, the TPP has an apparent density of 0.5 to 1.1, an agglomerate size of less than 100 microns, and preferably from 90 to 60 microns, and a phase I content of from 15 to 60%; further, it is devoid of any insoluble fraction.

Also in accordance with the present invention, the subject sodium tripolyphosphate is conveniently prepared by the process comprising:
(i) formulating an aqueous solution of monosodium and disodium orthophosphates, with the Na/P ratio thereof ranging from 1.64 to 1.70, by adjusting such ratio to the Na/P ratio desired in the ultimate final product;
(ii) establishing in suitable apparatus a vertically descending current of axially extending, axially symmetrical helical flow of hot gaseous phase, e.g., hot air;
(iii) separately establishing therein a second phase liquid current of coaxially downwardly vertically extending, rectilinear continuous jet stream of the aqueous orthophosphate solution formulated under (i) above;
(iv) maintaining said currents of said first hot gaseous and said second liquid orthophosphate phases physically separate from each other;
(v) circulating and directing said currents which comprise the respective plural phases to a zone of restricted flow passage with respect to said helical flow;
(vi) at said zone of restricted flow passage, converging and intimately, homogeneously admixing said plural currents, and atomizing into a multitude of droplets, and dispersing and thermally treating said rectilinear jet stream liquid orthophosphate current within said helical spinning current of hot gas.

In operation, at the zone of convergence of the respective phases the first phase helical flow of hot gas is such that the momentum thereof is at least 100 times greater, and preferably from 1,000 to 10,000 times greater, than the momentum of the second phase, coaxial rectilinear flow of the orthophosphate solution being thermally treated.

Also, the flow of the orthophosphate solution is at relatively low velocity, e.g., less than about 10 m/sec, and the hot gas stream is under relatively low pressure, e.g., less than about $10^5$Pa, and preferably from 0.4 to 0.6 $10^5$Pa As heretofore mentioned, the Na/P ratio of the starting solution ranges from 1.64 to 1.70, and same advantageously comprises from 15 to 50% by weight of dry solids content.

Such starting solution is preferably prepared by neutralizing $H_3PO_4$ with NaOH.

The temperature of thermal hydration at the point of actual treatment of the phosphate solution by means of the hot gas ranges from 380° to 450° C.

Also in operation, there is concurrently established within the apparatus a flow defining a layered horizontal stack of a plurality of hyperboloids by means of the trajectory of the helical current of hot gaseous flow, which, at a point downstream from said zone of restricted flow passage co-establishes a zone of narrower width than said zone of restricted flow passage. Thus, the helical flow of hot gas and the rectilinear streams of the orthophosphate solution in reality define three successive zones of intimate contact according to the invention, such zones serially succeeding each other in the absence of any discontinuity, and in the following order:
(1) a very short zone of dispersion;
(2) a zone in which the volumetric components of the hot gas and the droplets of the orthophosphate solution from gas/liquid couples along trajectories established by the hot gas and in essentially piston-like or plug flow; and
(3) an isothermal zone, where the thermal treatment is continued and completed.

Moreover, consistent herewith all of the heat exchange between the respective phases and for thermal treatment is effected in the plug-flow zone 2.

Moreover, the feed temperature of inlet of the hot gas must be relatively high, since the water has to be removed/vaporized from the orthophosphate solution in the zone 2. The choice of the particular temperature selected of course depends upon the several operating parameters of the subject process, but same should be several hundreds of degrees higher than the temperature existing in the isothermal zone 3, and advantageously is 400° to 600° C. higher than the temperature of the isothermal zone 3 under normal operating conditions.

For a more detailed description of apparatus and certain methodology for carrying out the process according to the invention, compare French Pat. Nos. 2,257,326 (corresponding to U.S. Ser. No. 916,477, filed June 19, 1978) 2,419,754 (corresponding to British Patent Specification No. 2,017,523), and U.S. Pat. No. 4,257,339. Cf. U.S. Pat. Nos. 4,124,353, 4,263,234, 4,265,702 and 4,267,131, and published European patent application No. 0,007,846, all assigned to the assignee hereof.

Detailed description of the process according to the invention, however is set forth in the aforenoted copending application, Ser. No. 395,798.

Suitable predispersion technique and/or chemical treatment may also be carried out simultaneously; respectively compare published French Applications, Nos. 80/17960 and 80/20464, also assigned to the assignee hereof.

The product sodium TPP is admirably well suited for those uses to which the "conventional" Na TPP is typically put, e.g., as foodstuff additives and in detergent compositions.

Referring specifically to the FIGURE of Drawing, suitable apparatus for carrying out the process according to the invention comprises a phase contactor/separator consisting essentially of a dispersing "head" 1, a double-cone treatment vessel 2, and a cyclone separator 3.

The head 1 comprises an inverted, truncated and upwardly perforated cone 4 downwardly depending from a cylindrical casing member and defining an annular space 9. Coaxial therewith is an internal tubular conduit or inlet pipe 8 for the orthophosphate solution feedstream, the same coaxially extending through the upside end of the casing member and deep within the truncated cone 4, said truncated cone 4 terminating in an outlet 7 or confining zone of restricted flow passage. The perforations 6 enable the establishment of a regularly repeating, helical path of axially extending downward flow which is essentially symmetrical with respect to at least one plane passing through the axis of the helical flow, such flow being established by means of the helical trajectory inducing tangential inlet 5 for the hot gaseous phase. The wall member comprising the treatment vessel 2 is integral with the outlet 7.

It will be seen that the orthophosphate solution is fed through the conduit 8 into the low pressure zone of the helical flow of hot gas, i.e., into the upstream end of the double-cone treatment vessel 2.

In order to further illustrate the present invention and the advantages thereof, the following specific examples are given, it being understood that same are intended only as illustrative and in nowise limitative.

EXAMPLE 1

This example illustrates the importance of the process of the invention in preparing TPP devoid of any insoluble fraction.

Into the apparatus shown in the FIGURE of Drawing, a feedstream aqueous solution containing 20.5% $P_2O_5$ and 14.9% $Na_2O$ (Na/P=1.664) was introduced, through the feed conduit 8, into a stream of hot air, heated to a temperature of 880° C., and circulating at a rate of 50 Nm3/h. The flow rate of the aqueous solution was adjusted such as to adjust the temperature at the point at which the gases and product emerge to 405°–420° C.

The rate of conversion to TPP was 97% and the amount of insolubles was less than 0.01% by weight.

In a conventional process (utilizing open flame or rotary dryers), calcination of an aqueous solution having the same Na/P ratio and at the same temperature, provides a mixture containing TPP, 95%; insolubles, 3% tetrasodium pyrophosphate, 2%.

The amount of insolubles measured by the following method: 20 g of product was dissolved in 400 cm$^3$ of water and brought to a boil for 10 minutes. The solutin was filtered after cooling on frit no. 4, previously dried for two hours at 110° C. The frit containing any washed precipitate was dried for two hours at 110° C. The amount of insolubles can be calculated from the difference in the weight of the frit before and after separation.

EXAMPLE 2

Effect of various factors on TPP

The TPP was prepared under the following conditions: the aqueous solution was obtained by neutralizing $H_3PO_4$ with NaOH, such that there resulted an $Na_2O/P_2O_5$ ratio of from 1.64 to 1.70 and a dry extract from 15 to 50%. The feed temperatures of the hot gases varied from 880° to 950° C.

By adjusting the flow rates of air (on the order of 50 Nm3/h in the tests carried out) and solution, an isothermal zone was established, advantageously at a temperature of from 390° to 450° C., corresponding to the temperature of the calcined product (TPP).

TABLE I

| Tests | $Na_2O$ % | $P_2O_5$ % | Na/P* | Dry extract % | $T_i$ intake of gas °C. | $T_d$ gas discharged °C. | Phase I % | Apparent density |
|---|---|---|---|---|---|---|---|---|
| 0 | 15.3 | 21.0 | 1.667 | 42 | 880 | 420 | 18 | 0.9 |
| Effect of Na/P ratio | | | | | | | | |
| 1 | 16.3 | 22.2 | 1.68 | 42 | 880 | 390 | 19 | 0.7 |
| 2 | 14.1 | 19.6 | 1.65 | 42 | 880 | 450 | 18 | 1.1 |
| Effect of amount of dry extract in initial solution | | | | | | | | |
| 3 | 14.1 | 19.6 | 1.65 | 15 | 950 | 420 | 28 | 0.7 |
| 4 | 14.1 | 19.6 | 1.65 | 42 | 880 | 450 | 18 | 1.1 |
| Effect of calcining temperature (temperature when discharged) | | | | | | | | |
| 5 | 14.1 | 19.6 | 1.65 | 42 | 880 | 400 | 37 | 0.8 |
| 6 | 14.1 | 19.6 | 1.65 | 42 | 880 | 420 | 18 | 1.1 |
| 7 | 16.3 | 22.2 | 1.68 | 42 | 880 | 390 | 19 | 0.7 |
| 8 | 16.3 | 22.2 | 1.68 | 42 | 880 | 450 | 18 | 0.8 |

*value to nearest 0.005

TABLE II

| Tests | % TPP |
|---|---|
| 0 | >98% |
| 1 | >92% |
| 2 | >90% |

TPP devoid of any phosphate impurity was obtained, if the Na/P ratio was properly set at 5/3. A mixture of TPP+ disodium dihydrogen pyrophosphate tetrasodium pyrophasphate or TPP+ resulted only if the Na/P ratio was incorrectly set. Thus, the amount of TPP obtained was approximately 90% in example no. 6 and over 98% when $T_d$ was 420° C. and Na/P=5/3 (test 0).

Furthermore, the TPP obtained in tests 1 to 8 was wholly devoid of insoluble fraction.

It will be appreciated in particular, that a TPP prepared in accordance with the test 5, containing 37% of phase I, did not undergo any caking, hardening or solidification in the test described above, and displayed less than 0.05% loss by weight of water at 150° C.

In a prior act technique carried out under the same conditions, on the other hand, an anhydrous TPP containing the same proportion of phase I underwent marked solidification.

A TPP containing half as much of phase I as in test 7 did not undergo any solidification upon passage of time, whereas a prior art TPP which was anhydrous (namely, displayed the same loss by weight of water at 150° C.) and which contained the same proportion of phase I, solidified.

From the foregoing, it is clearly apparent that the sodium TPP according to the invention is markedly different from the Na TPP of the prior art, behaving quite differently and being characterized by completely different properties.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. Anhydrous sodium tripolyphosphate, having the formula $Na_5P_3O_{10}$ wherein the Na/P ratio thereof is $1.667\pm0.01$, and being characterized by a less than 0.02% weight loss of water at 150° C., a phase I content of from 15 to 60% by weight, being devoid of insolubles fraction and exhibiting zero solidification or caking in a quiescent solvent medium.

2. The anhydrous sodium tripolyphosphate as defined by claim 1, having an apparent density of from 0.5 to 1.1, and a mean agglomerate size of less than 100 microns.

3. The anhydrous sodium trpolyphosphate as defined by claim 2, the means agglomerate size thereof ranging from 90 to 60 microns.

4. A process for the preparation of the anhydrous sodium tripolyphosphate as defined by claims 1 or 2, comprising:

(i) formulating an aqueous solution of monosodium and disodium orthophosphates, with the Na/P ratio thereof ranging from 1.64 to 1.70, by adjusting such ratio to the Na/P ratio in the desired final product;

(ii) establishing a vertically descending current of axially extending, axially symmetrical helical flow of a hot gaseous phase;

(iii) separately establishing a second phase liquid current of coaxially downwardly vertically extending, rectilinear continuous jet stream of the aqueous orthophosphate solution formulated under (i) above, the orthophosohate solution having a dry solids content of from to 1550% by weight and a feed rate velocity of less than about 10 m/sec;

(iv) maintaining said currents of said first hot gaseous and said second liquid orthophosphate phases physically separate from each other;

(v) circulating and directing said currents which comprise the respective plural phases to a low pressure zone of restricted flow passage with respect to said helical flow;

(vi) at said zone of restricted flow passage, converging and intimately, homogeneously admixing said plural currents, and atomizing into a multitude of droplets, and dispersing and thereafter thermally treating said rectilinear jet stream liquid orthophosphate current within said helical spinning current of hot gas;

(vii) at the restricted flow passage zone of convergence of the respective phases the first phase helical flow of hot gas is such that the momentum thereof is at least 100 times greater than the momentum of the second phase, coaxial rectilinear flow of the orthophosphate solution being thermally treated, the thermal treatment partially occurring in an isothermal zone, the temperature of the isothermal zone ranging from 380° to 450° C. with the temperature of the feed as being 400° to 600° C. higher; and (viii) recovering the resulting thermally treated material.

5. The process as defined by claim 4, wherein the step (vii) said momentum of the hot gas is from 1,000 to 10,000 times greater than the momentum of the orthophosphate phase.

6. The procees as defined by claim 4, said hot gas being at a pressure of from 0.4 to 0.6 $10^5$ Pa.

7. The process as defined by claim 4, said thermal treatment being conducted in a zone of plug-flow of the atomized droplets of feed solution and completed in the isothermal zone.

* * * * *